United States Patent [19]

Weisz et al.

[11] Patent Number: 4,716,136
[45] Date of Patent: Dec. 29, 1987

[54] MACROSTRUCTURAL UNIT HAVING A CATALYTICALLY-ACTIVE ZEOLITE SURFACE

[75] Inventors: Paul B. Weisz, Yardley; Tsoung Y. Yan, Philadelphia, both of Pa.

[73] Assignee: Mobil Oil Corporation, New York, N.Y.

[21] Appl. No.: 811,199

[22] Filed: Dec. 20, 1985

[51] Int. Cl.$^4$ .............................................. B01J 29/06
[52] U.S. Cl. .......................................... 502/64; 502/68
[58] Field of Search ..................................... 502/64, 68

[56] References Cited

U.S. PATENT DOCUMENTS

| | | | |
|---|---|---|---|
| 3,244,643 | 4/1966 | Schwartz | 502/64 |
| 3,468,815 | 9/1969 | Cole et al. | 502/64 |
| 3,518,206 | 6/1970 | Sowards et al. | 502/64 |
| 3,523,092 | 8/1970 | Kearby | 502/64 |
| 3,526,602 | 9/1970 | Kobayashi et al. | 502/64 |

Primary Examiner—Carl F. Dees
Attorney, Agent, or Firm—Alexander J. McKillop; Michael G. Gilman; Dennis P. Santini

[57] ABSTRACT

Macrostructural units of various shapes and forms having a catalytically-active zeolite surface particularly useful in catalyzing hydrocarbon conversion reactions are prepared by:

(a) mixing a slurry containing one or more of finely divided silicon, silica gel, alumina, aluminum hydroxide and kaolin, and having the desired ratio of silicon atoms to aluminum atoms, with plasticizer to form a plastic mass;

(b) shaping the plastic mass to a desired configuration;

(c) calcining the shaped plastic mass at 500° to 800° C. for 1 to 10 hours to form a rigid macrostructural unit having the same configuration as the shaped plastic mass;

(d) crystallizing 5 to 80% of the rigid macrostructural unit obtained by calcination to crystalline aluminosilicate zeolite; and, (e) activating the crystalline aluminosilicate zeolite to catalytically-active zeolite.

9 Claims, No Drawings

MACROSTRUCTURAL UNIT HAVING A CATALYTICALLY-ACTIVE ZEOLITE SURFACE

BACKGROUND OF THE INVENTION

1. Field of the Invention

This invention relates to a process for preparing macrostructural units having a catalytically-active zeolite surface, to the novel macrostructural units thereby produced and to processes for using such macrostructural units.

2. Description of the Prior Art

The use of zeolites as catalysts, particularly in the processing of petroleum and petroleum-derived products, is well known. Catalytically-active zeolites are most often utilized as loose particles, or aggregates of such particles, which may include a suitable binder, e.g., silica. Typical of industrial processes utilizing zeolites is a reactor filled with beads or pellets of the appropriate zeolite catalyst.

U.S. Pat. No. 3,119,660 describes the preparation of preformed bodies of pure crystalline zeolites having various shapes and dimensions. However, because of their particular crystal structure, shaped bodies made entirely of crystalline zeolite exhibit poor mechanical properties and are easily fractured.

SUMMARY OF THE INVENTION

It has been discovered that a large macrostructural unit having a catalytically-active zeolite surface as an integral part of the macrostructural unit functions as a zeolite, while retaining the mechanical strength of the underlying structural unit. Such a macrostructural unit can be prepared by:

(a) mixing a slurry containing one or more of finely divided silica, silica gel, alumina, aluminum hydroxide and kaolin, said slurry having a predetermined ratio of silicon atoms to aluminum atoms, with a fugitive binder to form a plastic mass;

(b) shaping the plastic mass to a desired configuration;

(c) calcining the shaped plastic mass at 500° to 600° C. for 1 to 10 hours to form a rigid macrostructural unit having the same configuration as the shaped plastic mass;

(d) crystallizing 5 to 80% of the rigid macrostructural unit obtained by calcination to form a crystalline aluminosilicate zeolite surface thereon; and (e) activating the crystalline aluminosilicate zeolite surface.

The present invention includes, in addition to the above-described process for making a macrostructural unit, the variously shaped macrostructural units so produced and processes for using those macrostructural units.

The macrostructural units according to the present invention can be fabricated in various shapes and forms, for example, hollow cylinders for use as interchangeable disk-like units in filling a reactor or as long cylinders having a tube-like shape. As will be described more fully below, the macrostructural units of the present invention may have a ridged or grooved surface or have other functional designs as part of their configuration, or may be in the form of square or rectangular blocks. In another embodiment, they may be part of a composite structure, for example, adhered to a substrate or provided with a metal backing, such as of aluminum.

DESCRIPTION OF THE PREFERRED EMBODIMENTS

The macrostructural units of the present invention are prepared by the following series of steps.

First, an aqueous slurry is prepared containing the appropriate starting materials, preferably with a silica-to-alumina ratio approximating that of the zeolite to be prepared. Other minerals and/or inorganic compounds may also be present in the slurry. The solids in the slurry should be in the form of finely sized particles. Preferred sources of silicon are silica and silica gel; preferred sources of aluminum are alumina and aluminum hydroxide; and preferred sources of both silicon and aluminum are kaolin and kaolin-like clays. Other suitable sources of silica and alumina will be apparent to those skilled in the art.

The slurry is intimately mixed, as by ball milling, together with a binder, such as mineral oil, polyethylene glycol or other such organic compound. The binder serves to bind the slurry into a plastic mass which can be shaped to the desired configuration, and which will hold its shape during calcination. The binder should be fugitive, i.e., capable of being volatilized or burnt out during the subsequent calcination step.

The plastic mass is formed into the desired configuration by conventional means for casting or molding plastics. For example, the plastic mass may be shaped by placing in a mold, by extrusion, or by casting onto a backing sheet. The backing sheet may be smooth or may be corrugated to provide ridges or grooves in the macrostructural unit to be prepared. The backing may be of paper or plastic, preferably treated with a release agent, so that the shaped plastic mass and backing sheet can be readily separated at the appropriate stage in processing. Or the backing may be a metal substrate treated, as with acid, so that the macrostructural unit being cast adheres to the substrate.

After the plastic mass is shaped to the desired configuration, its temperature is gradually raised and it is calcined at 500° to 800° C., preferably 500° to 650° C., to burn out the fugitive binder and to sinter the inorganic materials therein to form a rigid shape-retaining macrostructural unit. It will be appreciated that heating and calcining must be effected under controlled conditions so that the fugitive binder is not removed prematurely before sufficient sintering has occurred, and so that the mass being calcined has sufficient mechanical strength to maintain its shape during calcination.

In an alternate embodiment, the shaped plastic mass containing fugitive binder is not removed from its paper or plastic substrate, or from the paper or plastic mold in which it is formed, prior to calcination. In such embodiment, the paper and/or plastic will be burnt out along with the fugitive binder. When utilizing such procedure, it is apparent that the paper or plastic should be selected so that it will be consumed under the same conditions as the fugitive binder, and without having any adverse effects on the macrostructural unit being prepared.

One or more of the surfaces of the macrostructural unit obtained on calcination is converted to crystalline aluminosilicate zeolite by conventional procedures, such as described in "Zeolite Molecular Sieves", Donald W. Breck, Robert E. Krieger Publishing Co., Malabar, Fla. (1984), and well known to those skilled in the art. For example, crystallization is effected with a crystallization solution containing sodium hydroxide together with a crystallization directing agent, such as tetrapropylamine, tetramethylamine, ammonia or an aliphatic alcohol.

In one embodiment, a macrostructural unit, prepared as above, is immersed in a crystallization solution under hydrothermal conditions, e.g., 120° to 200° C. at 20 to 500 psig until about 5 wt %, and preferably about 10 wt %, but no more than about 80%, and preferably about 60 wt %, of the macrostructural unit is crystallized. At least about 5% crystallization is required to give a macrostructure, which on activation, has meaningful activity as a catalyst, but above about 80% crystallization, the structural strength of the macrostructural unit decreases to a point where the advantages of the invention are no longer obtained. Since crystallization starts at the surface or surfaces exposed and catalytic activity resides at or close to the surface, larger structural units, as a rule, will be proportionally less crystallized, whereas smaller or thinner units, relatively speaking, will be more crystallized.

In alternate embodiments, the macrostructural unit can be crystallized by dipping into, or spraying with, a crystallizing solution, and then held in the vapor phase over the crystallizing solution at the hydrothermal conditions described above until the desired degree of crystallization is obtained. Using such a procedure, the rate of crystallization can be increased by periodically contacting the macrostructural unit with crystallizing solution, such as by dipping and/or spraying. The procedure of this embodiment tends to produce crystalline layers of more uniform thickness, with a less likelihood of blocking the channels in the zeolite structure being formed.

When less than all of the surfaces of the macrostructural unit are to be crystallized, the surfaces not to be crystallized are protected or otherwise prevented from coming into contact with the crystallizing solution. For most intended uses there will be no detrimental effect observed when all surfaces are crystallized, even those not intended to function as a catalytically-active surface, provided total crystallization does not exceed 80%.

It is preferred that the initial slurry and subsequently the calcined macrostructural unit contain a ratio of silicon atoms to aluminum atoms approximating that of the final product. However, the crystallizing solution may contain silicon and aluminum compounds, and boron, phosphorus, and other compounds for incorporation into the macrostructural unit and the resultant crystalline zeolite. For example, additional silica can be introduced to a solid having the desired silica-to-alumina ratio by including a silicon compound in the crystallization solution. Zeolites, such as ZSM-5, having high silica-to-alumina ratios, crystallize faster than zeolites with lower silica-to-alumina ratios. Thus, when a silicon compound is included in the crystallization solution, the zeolite layer will display a gradation in its silica-to-alumina ratio, with a higher ratio closer to its surface, and be more shape-selective.

An important feature of the present invention is that the surface layer of zeolite formed is an integral part of the entire macrostructural unit. A much stronger and more satisfactory entity results than when a crystalline zeolite is adhered to or otherwise coated onto a substrate.

After the layer of crystalline aluminosilicate zeolite has been formed by treatment with crystallizing solution, it is activated in the usual way. For example, by ion-exchange procedures that will introduce hydrogen ions at tetrahedral aluminum sites on the zeolite directly, or by treatments that will lead to such sites indirectly. The most commonly practiced indirect method involves introduction of ammonium ions by ion-exchange followed by thermal decomposition. The macrostructural unit containing activated zeolite functions as a catalyst in the same general manner as the zeolite if it were present apart from the macrostructural unit. Thus, the catalytic activity of the zeolite layer may be enhanced or modified, using conventional techniques, as by exchange of hydrogen for metals or by impregnation with solutions containing metal ions.

The present invention utilizes the zeolite catalyst as a surface layer on a macrostructural unit, in contrast to the particles, granules, beads or pellets conventionally used to fill reactor spaces. The simplest reactor comprising a macrostructural unit according to the present invention would be a hollow cylindrical tube having a layer of catalytically-active zeolite on its surface. Using appropriate reaction conditions, reactants are introduced at one end of the tube, and product exits at the opposite end. The tube may be designed or several tubes assembled in such a fashion so as to provide a Y-shaped or other split-flow path, and preferably multiple crossover flow paths for the reactants, to promote mixing and contact of the reactants with the zeolite on the surface layer of the tube. In preparing the assemblage, care should be taken to keep the pressure drop within the assemblage small and to avoid crevices or other dead ends in the assemblage where reactants, products and/or byproducts can accumulate.

It is possible, of course, to choose other than a circular cross-section for the reactor, and the reactor may consist of an open-ended hollow square or rectangular block. Or it may consist of a bundle of relatively narrow tubes which are physically packed in parallel. In the latter configuration, the reactant may be unidirectionally passed through all of the tubes, or a manifold may be employed to direct the flow in one direction on some of the tubes, and in the opposite direction in others. The advantage of such an arrangement lies in the ability to obtain better lateral heat-exchange, leading to energy savings and a more uniform temperature conversion operation.

Systems comprising a bundle of narrow tubes having a catalytically-active zeolite layer on their inner surfaces are particularly useful in applications where both a high degree of reactant conversion and a low over-all pressure drop is required. Such systems are particularly useful in catalyzing the further oxidation of incompletely combusted oxides of nitrogen and carbon in gasoline engine exhaust gases.

It is apparent that when tubular units are used, they are generally prepared so as to contain a layer of the activated zeolite catalyst composition only on the inner surface of the tubular unit. However, layers of the zeolite catalyst may be present on both the inner and outer surfaces of the tube for use in a processes wherein reactant is made to flow longitudinally along a bundle of tubes, inside, outside, or both, or along cylindrical riser plates of other geometry.

The macrostructural units of the present invention can be provided as relatively uniformly sized cylinders, blocks, cubes and the like. Thus, they can be designed as conveniently sized, easy to handle, interchangeable segments for use in conjunction with conventional reactor shells. Such geometrically shaped segments are easy to assemble or store, and inventory and repair is simplified because only broken or defective segments need be replaced.

Processes which can be effected in reactors comprising macrostructural units according to the present invention include aromatic alkylation reactions, such as the addition of methanol to benzene or toluene, the addition of ethylene to benzene or toluene, and the addition of other olefins, alcohols, ethers, thioalcohols, thioethers, etc., to aromatic molecules. Also included are the generation of narrow or wide molecular weight ranges of gasoline, jet fuels and diesel fuels from lower gaseous olefins. Selective addition can be accomplished in the above types of reactions by proper choice of the zeolite type and of operating conditions.

The macrostructural units of the invention function not only as a catalyst, but as a flow-directing and flow-homogenizing means, when appropriate grooves or channels, preferably not exceeding about 0.3 cm in depth, are designed into the unit. Such grooved units are particularly useful in processes involving liquid reactants, and two-phase liquid and gas reactants. Illustrative examples of processes which can be carried out in a reactor containing macrostructural units having channels therein are the hydrodewaxing of petroleum fractions for the manufacture of fuels or lubricants, and the production of lubricating oil materials of high quality from lower molecular weight olefins. The process conditions used are those conventionally employed for processing hydrocarbons in the presence of the appropriate zeolite catalyst.

EXAMPLE 1

This example illustrates the preparation of a slurry containing silicon atoms and aluminum atoms in a ratio corresponding to zeolite A, which may be represented by the formula

$$1.0 \pm 0.2 Na_2 : Al_2O_3 : 1.85 \pm 0.5 SiO_2 : YH_2O$$

wherein Y may have any value from zero up to about 5.1.

One hundred grams of fired kaolin, ground to a fine particle size is suspended in one liter of water. Ten grams of polyethylene glycol, molecular weight approximately 4000, are added and the mixture homogenized to a plastic mass by blending in a ball mill.

EXAMPLE 2

This example illustrates the preparation of a shaped mass.

A portion of the plastic mass described in Example 1 is placed in a cardboard box having the shape of a shallow rectangular block and permitted to dry.

Another portion of the same plastic mass is packed into a plastic mold made of polyethylene having the shape of a hollow cylinder. In packing a mold, care must be taken to insure that no air bubbles are present and that the plastic mass completely and uniformly fills the mold. After standing for 24 hours, the mold is removed.

Another portion of the plastic mass described in Example 1 is extruded onto a corrugated sheet made of polypropylene and shaped to a generally rectangular configuration. After drying, the shaped plastic mass, having alternating grooves and ridges corresponding to the corrugations in the corrugated polypropylene, is separated.

Another portion of the plastic mass of Example 1 is layered onto a thin sheet of aluminum foil pre-treated with dilute hydrochloric acid. Using a mold having a circular configuration, the plastic mass is shaped, excess material and the mold are removed. The shaped plastic mass on the aluminum foil is permitted to dry for 24 hours at a slightly elevated temperature.

EXAMPLE 3

This example illustrates calcination of a shaped plastic mass.

The shaped plastic masses described above are placed in an oven equipped with a means for providing a continuous flow of air through the oven. The temperature in the oven is raised slowly over a period of hours until a temperature of 550° C. was reached and held at that temperature for 24 hours. At the end of that time, the shaped plastic masses are converted to rigid macrostructural units having the corresponding shapes, but of good mechanical strength.

EXAMPLE 4

This example illustrates crystallization of a portion of the macrostructure in a macrostructural unit.

The hollow cylinder macrostructural unit described above is immersed in a crystallizing solution containing equal parts of sodium hydroxide and water and about 5% by weight of triethylammonium chloride in a sealed system at 160° C. and ambient pressure. After about 6-8 hours, crystallization is approximately 30-40% complete. Both the interior and exterior portions of the hollow cylinder crystallize, starting from the external surfaces inward.

The solid cylinder macrostructural unit described above is immersed in a similar crystallizing solution kept at 150° C. in a sealed system at ambient pressures until crystallization is about 10% complete. In this case, crystallization is present only on the external surfaces of the cylinder.

The rectangular block macrostructural unit described above, masked on one side with a sheet of polyethylene plastic, is dipped into a crystallizing solution as described above and then held over the crystallizing solution in a sealed container at 160° at ambient pressures. The block is periodically dipped into the crystallizing solution during the course of the hydrothermal crystallization treatment until crystallization is about 60% complete. The block contains crystalline zeolite only on the unmasked surfaces exposed to hydrothermal treatment.

The rectangular shaped macrostructural composite adhered to an aluminum substrate described above is dipped into a similar crystallizing solution at a temperature of 150° C. and at ambient pressure, and periodically sprayed with crystallizing solution until crystallization is about 15% complete. Again, only the surfaces exposed to hydrothermal treatment are converted to crystalline zeolite.

EXAMPLE 5

This example illustrates activation of the zeolite formed above to a catalytically active zeolite catalyst.

The zeolite monoliths described above are immersed in a solution containing 5% of ammonium hydroxide and permitted to remain in that solution for 12 hours. Then the zeolites were removed, drained of excess water and heated at 500° C. for 6 hours.

EXAMPLE 6

This examples illustrates use of a macrostructural unit having a catalytically-active zeolite surface in a hydrocarbon conversion process.

A mixture of lower olefins comprising propene and butene, heated to about 300° C., is passed through a hollow cylinder having a coating of zeolite on its inner surface and activated, as described in Example 5. The product exiting from the cylinder contains hydrocarbons boiling in the gasoline range.

We claim:

1. A process for preparing a macrostructural unit having a catalytically-active zeolite surface as an integral part of the macrostructural unit, which comprises:
   (a) mixing a slurry containing one or more of finely divided silica, silica gel, alumina, aluminum hydroxide and kaolin, said slurry having a ratio of silicon atoms to aluminum atoms corresponding to that of the zeolite to be formed, with plasticizer to form a plastic mass;
   (b) shaping the plastic mass to a desired configuration;
   (c) calcining the shaped plastic mass at 500° to 800°C. for 1 to 10 hours to form a rigid macrostructural unit having the same configuration as the shaped plastic mass;
   (d) crystallizing 5 to 80% of the rigid macrostructural unit obtained by calcination to crystalline aluminosilicate zeolite; and,
   (e) activating the crystalline aluminosilicate zeolite to catalytically-active zeolite.

2. A process according to claim 1, wherein 10 to 60% of the rigid macrostructural unit obtained by calcination is crystallized.

3. A process according to claim 1, wherein the rigid macrostructural unit is crystallized by dipping into a crystallizing solution under hydrothermal conditions.

4. The macrostructural unit having a catalytically-active zeolite surface prepared by the process of claim 1.

5. A macrostructural unit according to claim 4, having a hollow center.

6. A macrostructural unit according to claim 5, in the form of a cylinder.

7. A macrostructural unit according to claim 5, in the form of a hollow tube.

8. A macrostructural unit according to claim 5, in the form of an open-ended hollow rectangular block.

9. A macrostructural unit according to claim 7, wherein the hollow tube is present in a bundle of hollow tubes.

* * * * *

UNITED STATES PATENT AND TRADEMARK OFFICE
CERTIFICATE OF CORRECTION

PATENT NO. : 4,716,136
DATED : December 29, 1987
INVENTOR(S) : Paul B. Weisz et al It is certified that error appears in the above-identified patent and that said Letters Patent is hereby corrected as shown below:

In the abstract, line 6, "silicon" should read -- silica --.

Signed and Sealed this

Twenty-first Day of June, 1988

*Attest:*

DONALD J. QUIGG

*Attesting Officer*  *Commissioner of Patents and Trademarks*